(12) United States Patent
Choi et al.

(10) Patent No.: US 7,029,796 B2
(45) Date of Patent: Apr. 18, 2006

(54) POSITIVE ACTIVE MATERIAL OF A LITHIUM-SULFUR BATTERY AND METHOD OF FABRICATING SAME

(75) Inventors: Soo-Seok Choi, Osan (KR); Yun-Suk Choi, Cheonan (KR); Ji-Seong Han, Suwon (KR); Seung-Hee Park, Suwon (KR); Yong-Ju Jung, Suwon (KR); Il-Young Lee, Daeku (KR)

(73) Assignee: Samsung SDI Co., Ltd., Suwon-si (KR)

( * ) Notice: Subject to any disclaimer, the term of this patent is extended or adjusted under 35 U.S.C. 154(b) by 309 days.

(21) Appl. No.: 10/405,237

(22) Filed: Apr. 3, 2003

(65) Prior Publication Data

US 2004/0058246 A1    Mar. 25, 2004

(30) Foreign Application Priority Data

Sep. 23, 2002  (KR)  ...................... 10-2002-0057576

(51) Int. Cl.
*H01M 4/62* (2006.01)
(52) U.S. Cl. ................ 429/232; 429/231.9; 429/218.1; 429/217; 252/182.1
(58) Field of Classification Search ................ 429/232, 429/231.9, 218.1, 217; 252/182.1
See application file for complete search history.

(56) References Cited

U.S. PATENT DOCUMENTS

| 5,919,587 | A | 7/1999 | Mukherjee et al. |
|---|---|---|---|
| 6,210,831 | B1 * | 4/2001 | Gorkovenko et al. ........ 429/213 |
| 6,376,123 | B1 | 4/2002 | Chu |
| 6,406,814 | B1 * | 6/2002 | Gorkovenko et al. .... 429/218.1 |
| 2003/0113627 | A1 * | 6/2003 | Choi et al. .................. 429/232 |

FOREIGN PATENT DOCUMENTS

| JP | 09-147868 | 6/1997 |
|---|---|---|
| KR | 2002-17289 | 3/2002 |
| WO | 99/33125 | 7/1999 |
| WO | 99/33127 | 7/1999 |
| WO | 99/33131 | 7/1999 |

OTHER PUBLICATIONS

Wang et al. "Polymer Lithium Cells with Sulfur Composites as Cathode Materials", Electrochimica Acta 48, pp. 1861-1867, 2003.*

E. Levillain et al.,; On the understanding of the reduction of sulfur ($S_8$) in dimethylformamide (DMF); Received Jan. 22, 1996; revised May 30, 1996; Journal of Electroanalytical Chemistry 420 (1997); pp. 167-177.

(Continued)

*Primary Examiner*—Laura Weiner
(74) *Attorney, Agent, or Firm*—Stein, McEwen & Bui, LLP

(57) ABSTRACT

A positive active material of a lithium-sulfur battery includes a sulfur-conductive agent-agglomerated complex in which a conductive agent particle is attached onto a surface of a sulfur particle having an average particle size less than or equal to 7 μm. The sulfur-conductive agent-agglomerated complex is manufactured by mixing a sulfur powder and a conductive agent powder to form a mixture, and milling the mixture.

31 Claims, 16 Drawing Sheets

OTHER PUBLICATIONS

E. Levillain et al.,; Polysulfides in diemthylformamide: only the redox couples $S^-_n/S^{2-}_n$ are involved; Received May 21, 1997; received in revised form Jul. 21, 1997; Journal of Electronanalytical Chemistry 440 (1997); pp. 243-250.

N. Oyama et al.; Dimercaptan-polyaniline composite electrodes for lithium batteries with high energy density; Nature. vol. 375; Feb. 16, 1995; pp. 598-600.

Korean Office Action dated Aug. 27, 2004.

Search Report issued in European Patent Application No. 03 007 388.6 on Nov. 4, 2005.

Jeon, Byoung Ho et al: "Preparation and Electrochemical Properties of Lithium-Sulfur Polymer Batteries," 2002, Journal of Power Sources. vol. 109, No. 1, pp. 89-97.

* cited by examiner

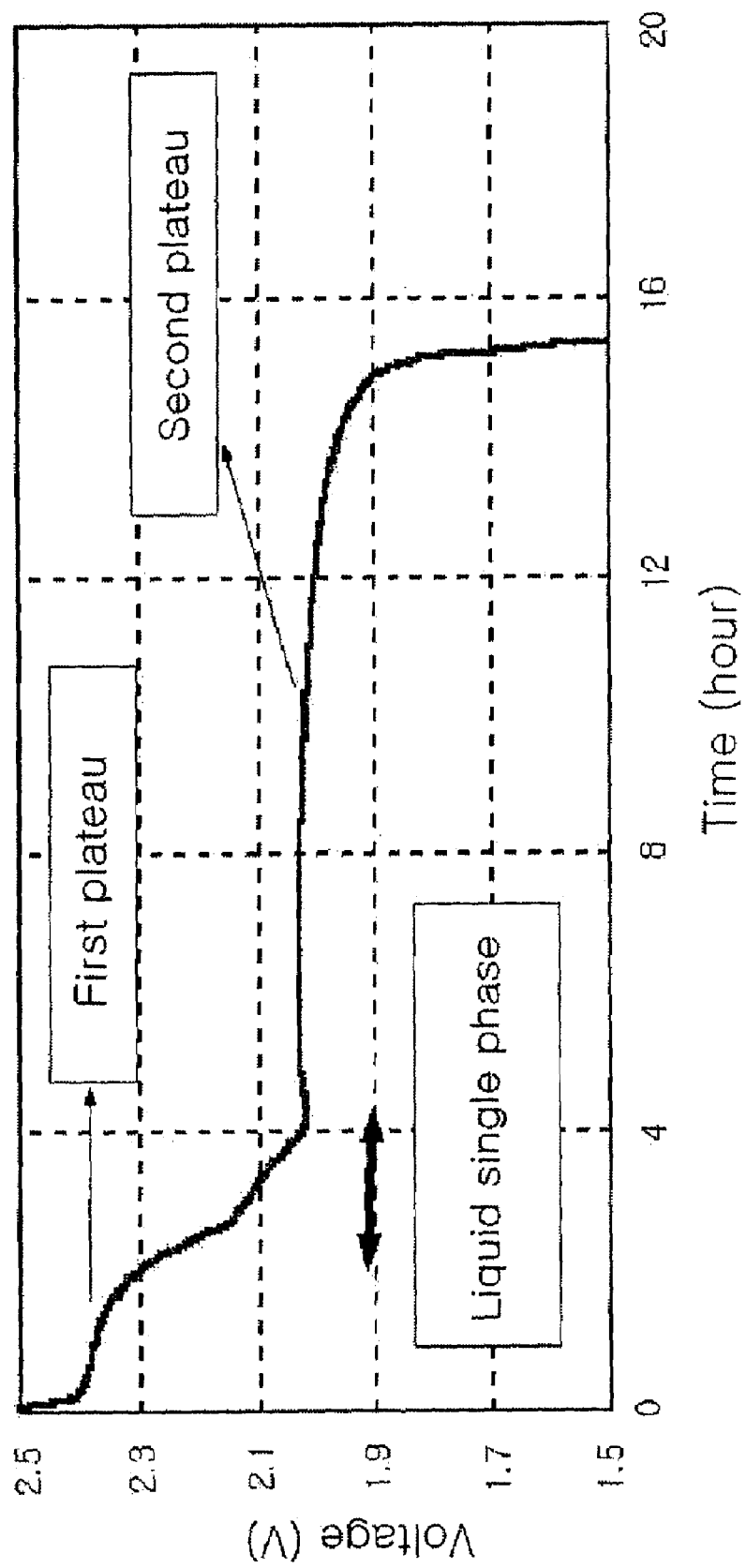

POSITIVE ACTIVE MATERIAL OF A LITHIUM-SULFUR BATTERY AND METHOD OF FABRICATING SAME

CROSS-REFERENCE TO RELATED APPLICATIONS

This application claims the benefit of Korean Application No. 2002-57576, filed Sep. 23, 2002, in the Korean Intellectual Property Office, the disclosure of which is incorporated herein by reference.

BACKGROUND OF THE INVENTION

1. Field of the Invention

The present invention relates to a positive active material of a lithium-sulfur battery and a method of fabricating the same, and more specifically, to a positive active material of a lithium-sulfur battery having high capacity and a method of fabricating the same.

2. Description of the Related Art

The use of portable electronic instruments is increasing as electronic equipment gets smaller and lighter due to developments in high-tech electronic industries. Studies on secondary batteries are actively being pursued in accordance with the increased need for a battery having high energy density to use as a power source in portable electronic instruments. The secondary batteries are also required to satisfy demands of low cost, safety, and environmental affinity.

Lithium-sulfur batteries are expected to satisfy demands since active materials used in the batteries, lithium and sulfur, are cheap and environmentally friendly, as well as having high theoretical capacities. For example, the theoretical capacity of lithium, used as a negative active material, is about 3800 mAh/g, while the theoretical capacity of sulfur, used as a positive active material, is about 1650 mAh/g.

The lithium-sulfur batteries are secondary batteries composed of a positive electrode containing a sulfur-based compound having sulfur-sulfur bonds and a negative electrode such as an alkaline metal, e.g., lithium. The batteries produce and store electric energy as the results of a redox reaction in which the oxidation number of sulfur is decreased and sulfur-sulfur bonds are cleaved upon the reduction reaction (discharge), and the oxidation number of sulfur is increased and sulfur-sulfur bonds are formed upon the oxidation reaction (charge). The sulfur based materials including sulfur and polysulfides are referred to "active sulfur."

The sulfur has complicated redox reactions where the polysulfides with various chain lengths are generated (E. Levillain et al., *J. Electroanal. Chem.* 420(1997) 167, *J. Electroanal. Chem.* 440(1997) 243). The net reaction occurring in the battery using active sulfur is illustrated by the following equation 1:

$$xLi+S \longleftrightarrow Li_xS \qquad (1)$$

The theoretical final oxidation state is $S_8$, and the final reduction state is $Li_2S$. When $S_8$ is completely reduced to $Li_2S$ (200% utilization in this patent), the theoretical capacity is estimated as 1675 mAh/g, which is a higher energy density than with any other chemicals.

The positive electrode is designed in either a manner in which active sulfur is dissolved in electrolyte (one phase positive electrode), or one in which the active sulfur coexists in partially solid (partial precipitation) and in partially solution phases. Refer to U.S. Pat. No. 6,030,720. Nevertheless, when either design is adopted, the active sulfur exists in both a solution phase and in a mixed phase of solid and liquid during progression of the charge and discharge in the lithium-sulfur battery (refer to FIG. 1). In FIG. 1, the solution phase is represented in a slope showing the sharp decline of discharge potential with the lapse of time. The plateau shows the region of coexisting solution and solid phases.

As a result, the positive active material of lithium-sulfur batteries exists in both solid and liquid phases, while that of other kind of batteries such as lithium ion batteries exists only as a solid. Lithium-sulfur batteries have a positive active material which may be attached to the positive electrode or dissolved in electrolyte.

Therefore, the positive active material may leak from the positive electrode into the separator or out of an electrode plate group (positive electrode, negative electrode, and separator) since it can be present in a flowing liquid phase. This renders the positive active material electrochemically inactive (incapable of participating in a redox reaction). Because this is an irreversible reaction, the lithium-sulfur battery does not display capabilities as well as is anticipated from the high theoretical capacity. Another problem is that the sulfur is precipitated on the surface of a conductive network by repeatedly reducing lithium polysulfide. This phenomenon seems to depend on the composition of the electrolyte.

To prevent these problems and to provide a lithium-sulfur battery having excellent capabilities, an organosulfur compound (U.S. Pat. Nos. 4,833,048, 4,917,974, and 5,162,175), DMcT-PAn (2,5-dimercapto-1,3,4-thiadiazol-polyanyline) (Oyama et al., Nature, 373, 598–600, 1995), and a carbon-sulfur compound (U.S. Pat. Nos. 5,441,831, 5,460,905, 5,601,947, and 5,609,720) have been suggested as a positive active material of lithium-sulfur batteries. However, these alternatives may cause problems, such as the organosulfur compound having a low theoretical capacity and a slow reaction rate, and the carbon-sulfur compound having a low theoretical capacity and not facilitating repeated realization of a material having the same molecular structure.

The elemental sulfur ($S_8$) is expected to provide a positive electrode having high capacity and active material densities due to use of a powder form, which has the highest theoretical capacity. Elemental sulfur generally has no electrical conductivity, i.e., sulfur is a non-conductive material. Accordingly, to have an electrochemical reaction take place in the battery, an electrically conductive agent capable of providing a fluent electrochemical reaction must be added. U.S. Pat. Nos. 5,523,179 and 5,582,623 disclose a method to prepare an active sulfur-containing electrode comprising mixing sulfur and a conductive agent of carbon powder with a positive active material layer (mass). However, the sulfur is converted to polysulfide upon repeated charge and discharge cycles, then the polysulfide is effused to the electrolyte as a liquid phase in the aforementioned structure. Thus, the electrode structure collapses, decreasing the capacity and cycle-life characteristics of the lithium-sulfur battery.

In order to solve the above-cited problems, delaying the effluent of the positive active material by adding an absorbent capable of absorbing sulfur into a positive active material slurry is being studied. For the absorbent, Japanese un-Examined Patent Publication No. H09-147868 (Jun. 6, 1997) discloses an active carbon fiber, and U.S. Pat. No. 5,919,587 discloses a positive active material embedded between transition metal chalcogenides having a highly porous, fibrous, and ultra-fine sponge-like structure and a positive active material encapsulated with the same. WO 99/33131 discloses a method to add a particulate such as carbon, silica, or aluminum oxide having a potent absorbing characteristic to polysulfide. WO 99/33125 discloses a method to prevent the diffusion of the soluble polysulfide by encapsulating the positive electrode with a separator of a micro-porous pseudo-boehmite layer. WO 99/33127 discloses a cationic polymer comprising a quaternary ammonium salt group to make polysulfide anions stay around the cationic polymer. Nonetheless, the above disclosures do not avoid a deteriorating energy density due to an additional additive having specific functions.

SUMMARY OF THE INVENTION

It is an aspect of the present invention to provide a positive active material of a lithium-sulfur battery capable of improving capacity and cycle life.

It is a further aspect of the present invention to provide a positive active material of a lithium-sulfur battery that is favorable to control a particle size without aggregating sulfur particles.

It is still a further aspect of the present invention to provide a lithium-sulfur battery having improved capacity and cycle-life characteristics.

Additional objects and advantages of the invention will be set forth in part in the description which follows and, in part, will be obvious from the description, or may be learned by practice of the invention.

To accomplish these and/or other aspects, the present invention provides a positive active material of a lithium-sulfur battery including a sulfur-conductive agent-agglomerated complex in which the conductive agent particle is attached onto the surface of a sulfur particle having an average particle size less than or equal to 7 μm.

In an aspect, the present invention also provides a method of fabricating a positive active material of a sulfur-conductive agent-agglomerated complex in which the conductive agent particle is attached onto the surface of a sulfur particle having an average particle size less than or equal to 7 μm, comprising mixing a sulfur powder and a conductive agent powder to form a mixture and milling the mixture.

In an aspect, the present invention also provides a lithium-sulfur battery comprising a positive electrode including a positive active material comprising a sulfur-conductive agent-agglomerated complex in which the conductive agent particle is attached onto the surface of a sulfur particle having an average particle size less than or equal to 7 μm; a negative electrode including a negative active material selected from the group consisting of a material capable of reversibly intercalating lithium ions, a material capable of reversibly reacting with lithium metals, a lithium metal, or a lithium alloy; and an electrolyte.

BRIEF DESCRIPTION OF THE DRAWINGS

These and/or other aspects and advantages of the invention will become apparent and more readily appreciated from the following description of the preferred embodiments, taken in conjunction with the accompanying drawings of which:

FIG. 1 shows a graph illustrating a discharge curve of a positive electrode in a conventional lithium-sulfur battery.

DETAILED DESCRIPTION OF THE PREFERRED EMBODIMENTS

Figure 2A:
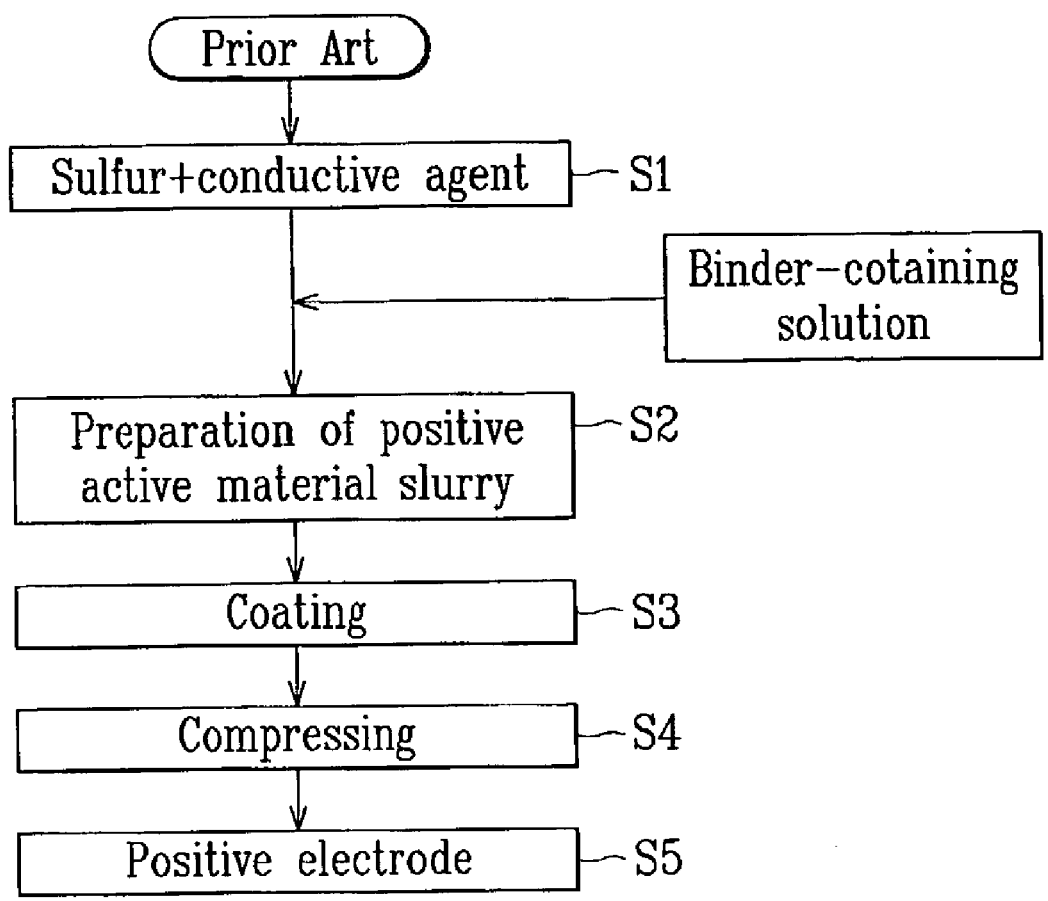
FIG. 2A shows a flowchart of a process of fabricating a positive electrode plate comprising a conventional positive active material.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

An embodiment of the present invention will be explained with reference to the accompanying drawings. Elemental sulfur is a non-conductive material, so an electrically conductive agent capable of providing an effluent conductive network must be added to prepare a positive electrode using the elemental sulfur.

The conventional process of introducing a conductive agent to the positive electrode is to add a conductive agent powder together with a sulfur powder during the preparation of a slurry for an electrode, as shown in FIG. 2A. More specifically, the sulfur powder and the conductive agent powder are mixed (S1), a binder solution is added to provide a slurry of a positive active material (S2), a current collector is coated with the slurry (S3), and the coated collector is subjected to a rolling process (S4). Thus, a positive electrode plate is prepared (S5).

If the sulfur and conductive agent are simply added to a binder solution to prepare a slurry, the particle size of the sulfur particles is not controlled due to the aggregation of sulfur particles, and the sulfur particles are irregularly distributed in the electrode plate. When the sulfur particles are aggregated, the sulfur is effused as polysulfide upon repeated charge and discharge cycles so the size of obtained pores is enlarged, and the pores are irregularly distributed.

In an embodiment of the present invention, a sulfur-conductive agent-agglomerated complex, in which the conductive agent particle is attached onto the surface of sulfur particles having an average particle size less than or equal to 7 μm, is used to prepare a slurry of a positive active material.

The positive electrode of a lithium-sulfur battery comprises a positive active material layer coated on a current collector, wherein the positive active material layer comprises a positive active material, a conductive agent, and a binder. The binder acts to bind the positive active material and the conductive agent tightly as a network to maintain the conductive network structure of the positive active material layer. The electrochemical reaction occurs at an electrochemically active site on the surface of solid sulfur, but does not occur inside of the solid sulfur, since the solid sulfur is non-conductive. Accordingly, the number of active sites must be increased to improve the effectiveness of the reaction in the lithium-sulfur battery. Thus, the reactive surface area may be increased by decreasing the average particle size of the solid sulfur.

According to an embodiment of the present invention, the average particle size of sulfur is maintained at a size that is less than or equal to 7 μm, preferably up to 5 μm, more preferably up to 3 μm. If the average particle size is more than 7 μm, it is not preferable since the reactive surface area is decreased. According to an embodiment of the present invention, a sulfur-conductive agent-agglomerated complex is utilized wherein the conductive agent particle is attached onto the surface of a sulfur particle, so that aggregation between sulfur particles is prevented, and the sulfur particle size is easily regulated during the preparation of a slurry.

Examples of the conductive agent include, but are not limited to, carbon black, graphite, carbon fiber, carbon nanotubes, activated carbon, carbon prepared by heat-treating cork or pitch, a metal powder, a metal compound, and a mixture thereof. The carbon black may include ketjen black, denka black, acetylene black, thermal black, channel black, PRINTEX XE2B (manufactured by DEGUSSA), SUPER P (manufactured by MMM), KS 6 (manufactured by TIMCAL), CORAX HI-BLACK 40B2 (KOREA CARBON BLACK CO., LTD), VULCAN XC72 (CABOT CORP.), etc. The graphite may be a synthetic graphite or a natural graphite. Examples of the metal may include Sc, Ti, V, Cr, Mn, Fe, Co, Ni, Cu, Zn, Al, etc. The metal compound may be a perovskite material such as $SnPO_4$, titanium oxide, $LaSrCoO_3$, and $LaSrMnO_3$.

The conductive agent may be a powder that may have an average particle size of between 10 nm and 20 μm, which is varied depending upon the kind of conductive agent. For example, carbon black preferably has an average particle size of between 10 nm and 200 nm, and more preferably between 10 nm and 100 nm. Graphite preferably has an average particle size of between 100 nm and 5 μm, and more preferably between 100 nm and 1 μm. The conductive agent may be used in mixing the carbon black with the graphite, in which the carbon black and the graphite may have different average particle sizes.

The sulfur powder and the conductive agent powder are mixed and subjected to a milling process to prepare a sulfur-conductive agent-agglomerated complex. The milling process may be performed without adding solvent, i.e., a dry milling process, or by adding solvent, i.e., a wet milling process. The solvent used in the wet milling process may include, but is not limited to, isopropyl alcohol, acetonitrile, ethanol, methanol, water, dimethylformamide, ether, hexane, cyclohexane, etc. The milling process may be performed by the conventional methods conceived in the art, and may be performed by a ball milling process.

The milling process is carried out for between 6 hours and 5 days. When the milling process is carried out for less than 6 hours, the particle size of the sulfur-conductive agent-agglomerated complex is excessively coarse. If the milling process is carried out for more than 5 days, money and time are wasted.

The sulfur-conductive agent-agglomerated complex obtained from the milling process may be subjected to a drying process at a temperature of between 30° C. and 100° C. The drying duration may be between 2 and 24 hours.

Figure 3:
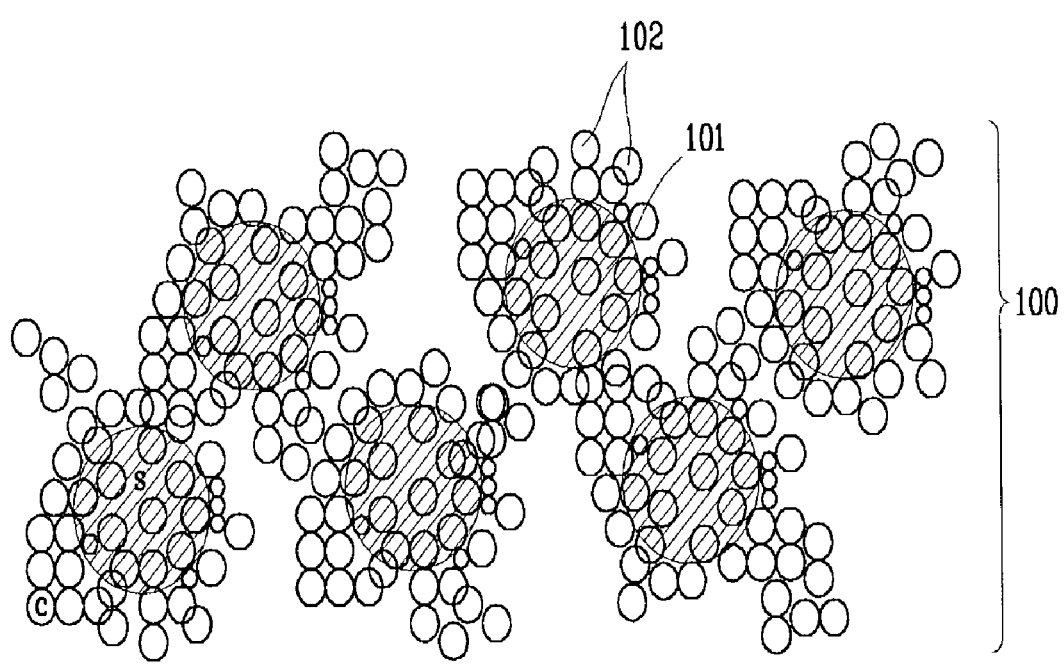
FIG. 3 shows a schematic view of a positive active material of a sulfur-conductive agent-agglomerated complex according to the present invention.

FIG. 3 schematically shows the sulfur-conductive agent-agglomerated complex obtained from the milling and drying processes. As shown in FIG. 3, the sulfur-conductive agent-agglomerated complex 100 according to the present invention has a structure in which the conductive agent powder 102 is attached onto the surface of the sulfur powder 101.

The sulfur-conductive agent-agglomerated complex is composed in a sulfur to conductive agent weight ratio of 5~10:1, and preferably 6~8:1. When the sulfur to conductive agent weight ratio is less than 5:1, the amount of sulfur becomes too minor to provide a battery having high capacity. On the other hand, if the sulfur to conductive agent weight ratio is more than 10:1, the amount of conductive agent is too small to increase the reactive site on the electrode, causing a problem in that the high C-rate characteristic deteriorates in the battery.

Figure 2B:
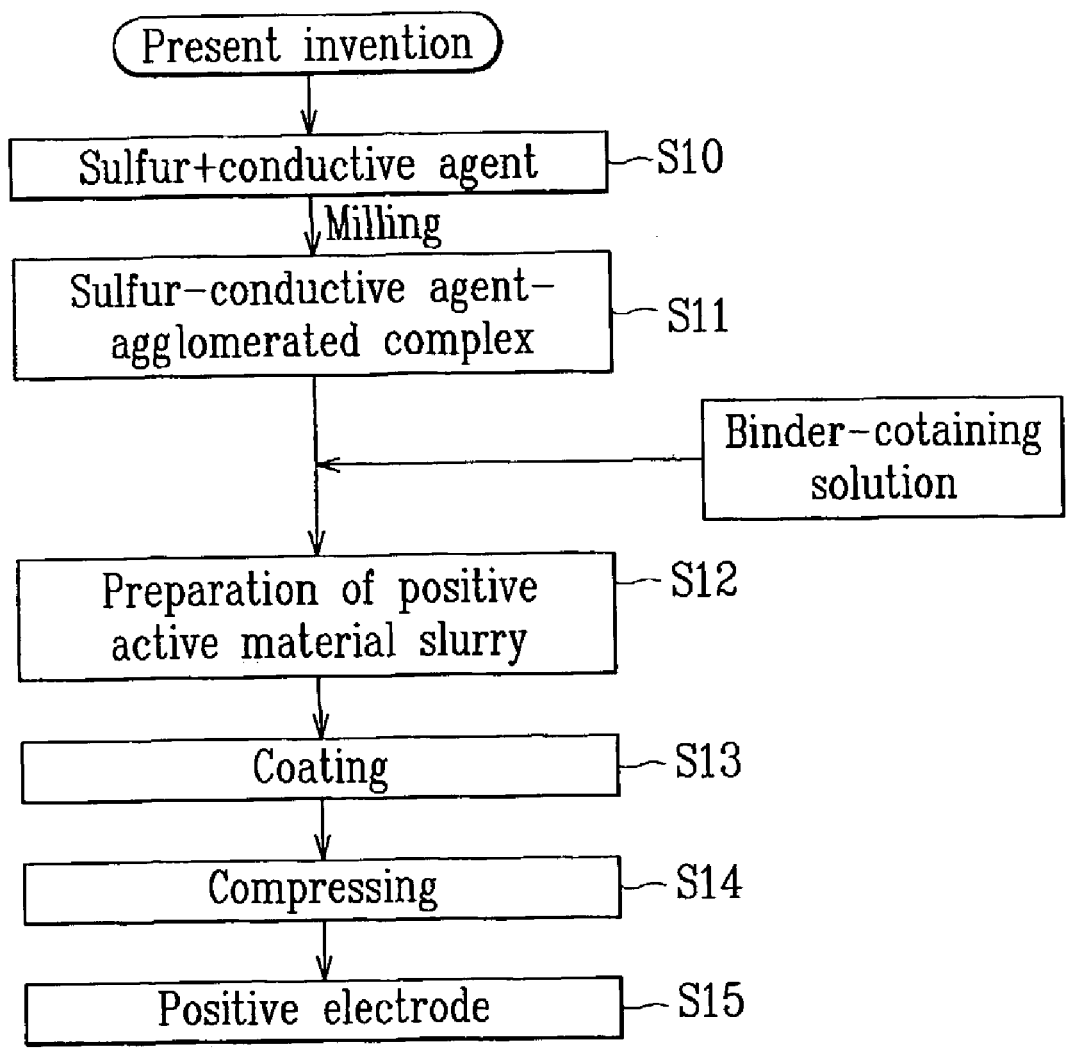
FIG. 2B shows a flowchart of a process of fabricating a positive electrode plate comprising a positive active material according to an embodiment of the present invention.

FIG. 2B shows a method of fabricating a positive electrode using a positive active material of sulfur-conductive agent-agglomerated complex according to an embodiment of the present invention. The sulfur and conductive agent are mixed (S10) and milled to provide a sulfur-conductive agent-agglomerated complex (S11). Then a binder solution is added thereto to provide a slurry of positive active material (S12). A current collector is coated with the slurry (S13) and rolled (S14) to provide a positive electrode plate.

According to an embodiment of the present invention, the positive active material of the sulfur-conductive agent-agglomerated complex is easily dispersed in the binder solution during the preparation of the slurry (S12), and the sulfur particles are not aggregated so that the particle size of sulfur is regulated, and the size of pores generated on the positive electrode during charge and discharge is decreased. The pore distribution is also controlled to provide a uniform distribution of pores on the electrode. Since the conductive agent is present in amounts just required to bind the conductive network on the surface of the sulfur particle, an amount of sulfur increases and an amount of the conductive agent and the binder decreases in the slurry compared to amounts conventionally used, so that a positive electrode having relatively high capacity may be obtained.

A binder solution is prepared by adding a binder to the solvent that binds the positive active material to the current collector. Examples of binders that may be used include poly(vinyl acetate), polyvinyl alcohol, polyethylene oxide, polyvinyl pyrrolidone, alkylated polyethylene oxide, cross linked polyethylene oxide, polyvinyl ether, poly(methyl methacrylate), polyvinylidene fluoride, a copolymer of polyhexafluoropropylene and polyvinylidene fluoride (KYNAR), poly(ethyl acrylate), polytetrafluoro ethylene, polyvinyl chloride, polyacrylonitrile, polyvinylpyridine, polystyrene, derivatives thereof, blends thereof, and copolymers thereof. Among the examples, polyethylene oxide, polyvinyl pyrrolidone, and polyvinyl alcohol are preferable since the examples are media capable of passing ions to act as an ionic conductive agent.

The solvent dissolving the binder is capable of homogeneously dispersing the positive active material and the binder. Preferably, the solvents are easily evaporated. Useful solvents include acetonitrile, methanol, ethanol, tetrahydrofurane, water, isopropyl alcohol, and dimethyl formamide.

To the slurry in which the positive active material and the binder are homogeneously dispersed, at least one additive selected from transition metals, Group IIIA elements, Group IVA elements, sulfur compounds thereof, or alloys thereof may be further added. The examples of transition metals include Sc, Ti, V, Cr, Mn, Fe, Co, Ni, Cu, Zn, Y, Zr, Nb, Mo, Tc, Ru, Rh, Pd, Ag, Cd, Ta, W, Re, Os, Ir, Pt, Au, and Hg. The Group IIIA elements preferably may include one selected from the group consisting of Al, Ga, In, and Tl. The Group IVA elements preferably may include one selected from the group consisting of Si, Ge, Sn, and Pb.

The positive active material slurry may further comprise, if required, the electrically conductive agent which is used in preparing the sulfur-conductive agent-agglomerated complex in order to facilitate the movement of electrons within the positive electrode. The conductive agent used for the sulfur-conductive agent-agglomerated complex is attached onto the surface of sulfur particles, while the additional conductive agent for the slurry is present independently from the sulfur-conductive agent-agglomerated complex.

The amount of positive active material, binder, solvent, or optional additives is not critical, as long as the resultant slurry has a viscosity suitable for coating.

The slurry is coated on a current collector in an appropriate thickness depending upon the slurry viscosity and the thickness of the positive electrode, forming a positive active material layer (S13) that may be between 2 and 200 μm thick. Non-limiting examples of the current collector may include a conductive material such as stainless steel, aluminum, cupper, and titanium, and preferably, a carbon-coated aluminum current collector. The carbon-coated aluminum current collector has some benefits compared with an aluminum current collector without carbon coating. The carbon-coated aluminum current collector has an excellent adhesive strength, allowing the current collector to adhere readily to the active material, a low contact resistance, and corrosion resistance against polysulfide.

Figure 4:
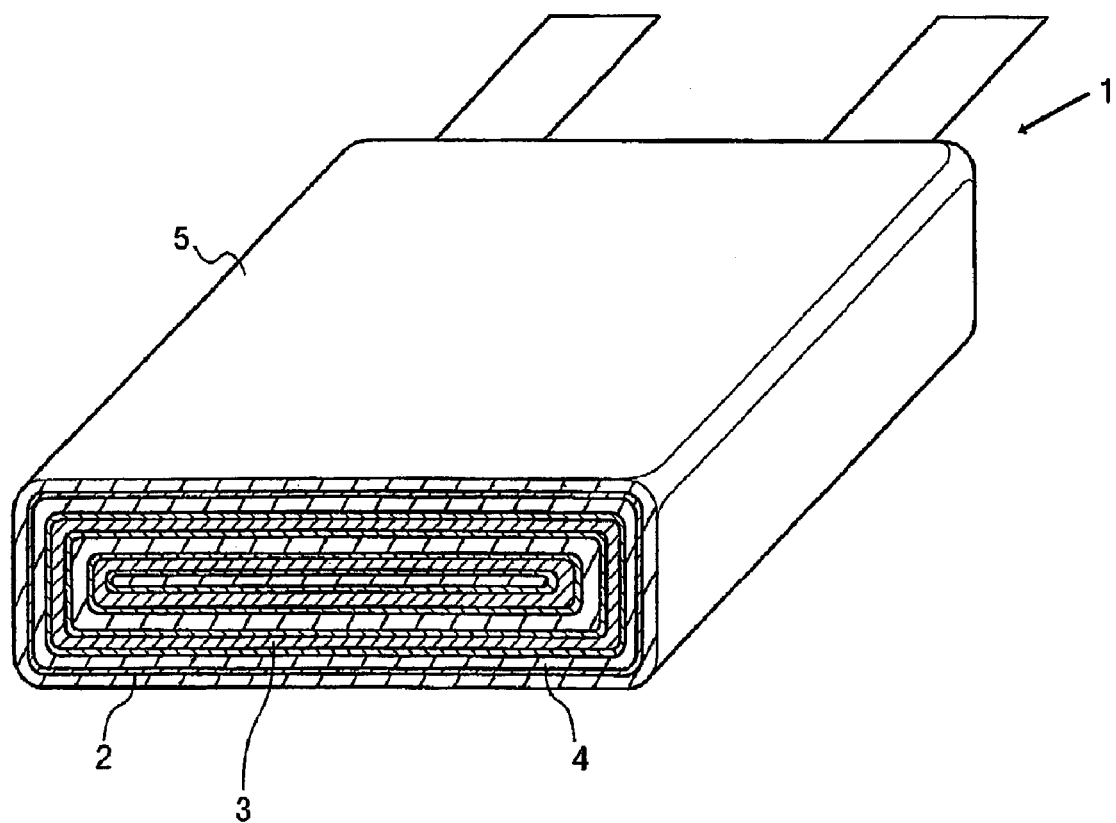
FIG. 4 shows a perspective view of a lithium-sulfur battery according to an embodiment of the present invention.

FIG. 4 shows a perspective view of a lithium-sulfur battery manufactured by using the positive electrode according to an embodiment the present invention. The lithium-sulfur battery 1 comprises a battery can 5 enclosing a positive electrode 3, a negative electrode 4, and a separator 2 interposed between the positive electrode 3 and the negative electrode 4. The electrolyte is injected between the positive electrode 3 and the negative electrode 4.

The negative electrode 4 includes a negative active material selected from the group consisting of a material capable of reversibly intercalating lithium ions, a material capable of reversibly reacting with lithium ions to form a lithium-containing compound, a lithium alloy, and a lithium metal. The materials in which lithium intercalation reversibly occurs are carbon-based compounds. Any carbon material may be used as long as the carbon material is capable of intercalating and deintercalating lithium ions. Examples of the carbon material include crystalline carbon, amorphous carbon, or a mixture thereof. The represented examples of a material capable of reversibly reacting with lithium ions to form a lithium-containing compound include, but are not limited to, $SnO_2$, titanium nitrate, Si, etc. The examples of a lithium alloy may include, but are not limited to, an alloy of lithium with a metal selected from the group consisting of Na, K, Rb, Cs, Fr, Be, Mg, Ca, Sr, Ba, Ra, Al, and Sn.

The negative electrode may be a material in which an inorganic protective layer, an organic protective layer, or both is laminated on the surface of lithium metal. The inorganic protective layer may comprise a material selected from the group consisting of Mg, Al, B, C, Sn, Pb, Cd, Si, In, Ga, lithium silicate, lithium borate, lithium phosphate, lithium phosphor nitride, lithium silicosulfide, lithium borosulfide, lithium aluminosulfide, and lithium phosphosulfide. The organic protective layer may comprise a conductive monomer, oligomer, or polymer selected from the group consisting of poly(p-phenylene), polyacetylene, poly(p-phenylene vinylene), polyanyline, polypyrrol, polythiophen, poly(2,5-ethylene vinylene), acetylene, poly(peri-naphthalene), polyacene, and poly(naphthalene-2,6-diyl).

During the charge and discharge cycle, the sulfur used for the positive active material may be converted to inactive sulfur and attached onto the surface of the lithium negative electrode. The inactive sulfur is defined as sulfur that is incapable of taking part in the electrochemical reaction of the positive electrode. Accordingly, the inactive sulfur renders a benefit of providing the surface of the negative electrode with a protective layer. The negative electrode may comprise a lithium metal and inactive sulfur such as lithium sulfide formed on the lithium metal.

The lithium-sulfur battery further comprises an electrolyte. The electrolyte is in a solid phase or a liquid phase. The solid electrolyte acts as a separator mechanically separating two electrodes as well as a medium to transport metal ions. Any ionic conductive material can be useable as long as the ionic conductive material is electrochemically stable. The ionic conductive material may be exemplified by a glass electrolyte, a polymer electrolyte, or a ceramic electrolyte. The preferable solid electrolyte has an appropriate electrolyte support salt mixed in a polymer electrolyte such as polyether, polyimine, and polythioether. The solid electrolyte separator may comprise a non-aqueous inorganic solvent of less than about 20 wt %. In this case, the electrolyte may further comprise a suitable gelling agent to decrease the fluidity of the organic solvent.

If the liquid electrolyte is adopted in the lithium-sulfur battery, a separator comprising porous glass, plastic, ceramic, or polymer is further required to mechanically separate the electrodes. The liquid electrode comprises a non-aqueous organic solvent and an electrolyte salt. The organic solvent may use any conventional non-aqueous organic electrolyte such as ethylene carbonate, propylene carbonate, dioxolane, sulfolane, xylene, diglyme, tetrahydrofurane, and tetraglyme.

The electrolyte salt may be a lithium salt including lithium cations, a salt including organic cations, or a mixture thereof. The examples of lithium salt include, but are not limited to, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are natural numbers), LiCl, and LiI.

The organic cation-included salt has advantages of low vapor pressure, high flash point, and inflammability and corrosion resistance to provide a mechanically stable film. The preferable salt includes large organic cations having a van der Waals volume of no less than 100 Å$^3$. The more the van der Waals volume of cations, the less the lattice energy of molecules and the more the ionic conductivity.

The organic cation-included salt can be present in a liquid phase at a wide range of temperatures, and particularly at a temperature of operating the battery. The organic cation-included salt is preferably capable of being in a liquid phase at no more than 100° C., more preferably no more than 50° C., and most preferably no more than 25° C. The organic cation-included salt can be present in a liquid phase at different temperatures depending upon the application method.

The organic cations may be cationic heterocyclic compounds. The hetero atom is selected from N, O, S, or a combination thereof. The number of hetero atoms is preferably between 1 and 4, and more preferably between 1 and 2. Examples of a cationic heterocyclic compound may include, but are not limited to, pyridinium, pyridazinium, pyrimidinium, pyrasinium, imidazolium, pyrazolium, thiazolium, oxazolium, and triazolium, or a substitute thereof. A preferable compound is exemplified as a cation of an imidazolium compound such as 1-ethyl-3-methylimidazolium (EMI), 1,2-dimethyl-3-propyl imidazolium (DMPI), or 1-butyl-3-methylimidazolium (BMI).

The anion to be bound with the cation is exemplified as bis(perfluoro ethylsulfonyl)imide ($N(C_2F_5SO_2)_2^-$, Beti), bis(trifluoro methylsulfonyl)imide ($N(CF_3SO_2)_2^-$, Im) tris(trifluoro methylsulfonyl methide ($C(CF_3SO_2)_2^-$, Me), trifluoro methane sulfonimide, trifluoro methyl sulfonimide, trifluoro methylsulfonate, $AsF_6^-$, $ClO_4^-$, $PF_6^-$, and $BF_4^-$.

The organic cation-included salt is preferably 1-ethyl-3-methylimidazolium bis(perfluoro ethylsulfonyl)imide (EMI-Beti), 1,2-dimethyl-3-propyl imidazolium bis(trifluoromethyl sulfonyl)imide (DMPIIm), or 1-butyl-3-methylimidazolium hexafluorophosphate ($BMIPF_6$).

Hereinafter, the present invention will be explained in detail with reference to examples. These examples, however, should not in any sense be interpreted as limiting the scope of the present invention.

EXAMPLE 1

Figure 5:
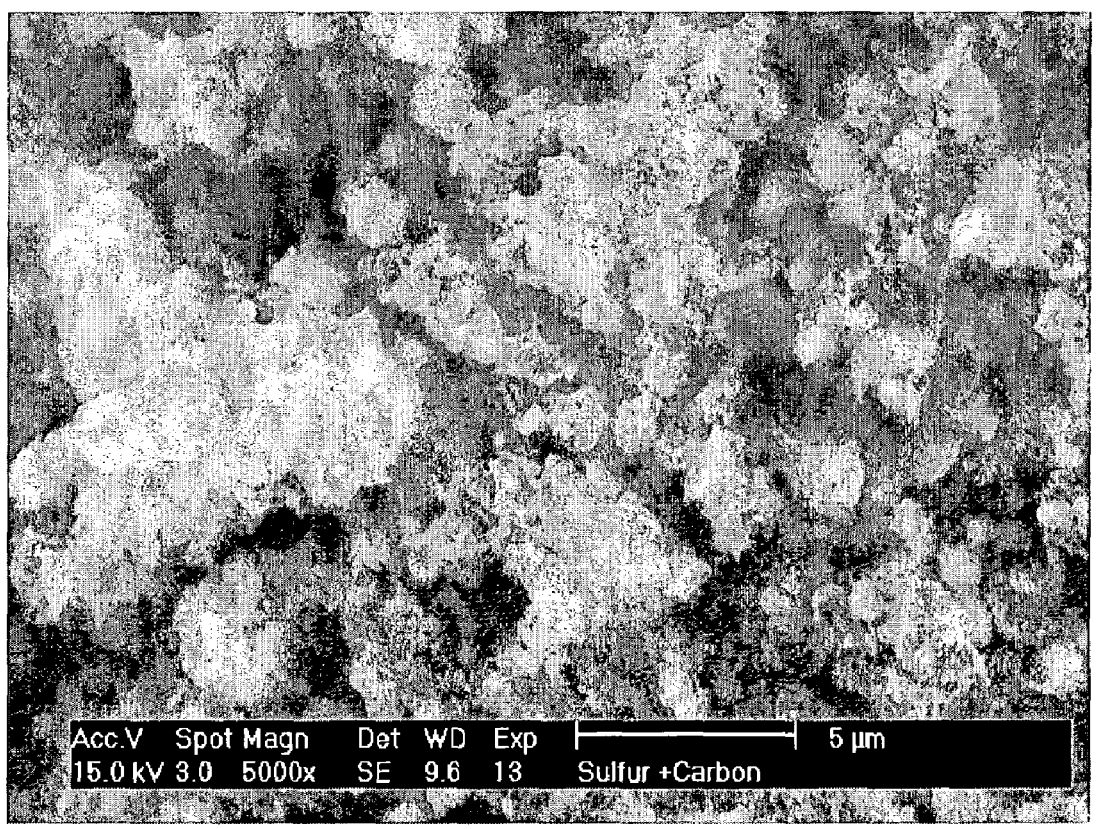
FIG. 5 shows a Scanning Electron Microscope (SEM) photograph of a positive active material of a sulfur-conductive agent-agglomerated complex according to Example 1 of the present invention.

67.5 parts by weight of elemental sulfur ($S_8$) and 11.4 parts by weight of ketjen black were introduced into a mixing bowl and were subjected to a ball milling process after adding 200 g isopropyl alcohol, for 3 days, to obtain a slurry. The slurry was dried at 60° C. for 4 hours to obtain a sulfur-ketjen black agglomerated complex. FIG. 5 is a SEM photograph of a sulfur-ketjen black agglomerated complex. The average particle size of sulfur is approximately 3 μm, as shown in FIG. 5.

Using the prepared sulfur-ketjen black agglomerated complex as a positive active material, a test cell was assembled as follows: the sulfur-ketjen black agglomerated complex was added to a binder solution to prepare a slurry for a positive active material; the binder solution was prepared by adding 21.1 parts by weight polyethylene oxide into acetonitrile; and the uniformly dispersed slurry was coated on a carbon-coated Al current collector with a doctor blade to provide a positive electrode. The resultant positive electrode had an energy density of 2.0 mA/cm².

The positive electrode, the vacuum dried polyethylene separator, and a lithium negative electrode were successively laminated and put into a pouch. An electrolyte of 1M $LiN(CF_3SO_2)$ in 1,3-dioxolane/dimethoxyethane/diglyme (2/4/4 volume ratio) was then injected therein, and the pouch was sealed to provide a pouch-type test cell.

EXAMPLE 2

85 parts by weight of elemental sulfur powder and 14 parts by weight of ketjen black were introduced into a mixing bowl and were subjected to a ball milling process after adding 200 g of isopropyl alcohol, for 3 days, to obtain a slurry. The slurry was dried at 60° C. for 4 hours to obtain a sulfur-ketjen black agglomerated complex.

Using the prepared sulfur-ketjen black agglomerated complex as a positive active material, a test cell was assembled as follows: the sulfur-ketjen black agglomerated complex was added to a binder solution to prepare a slurry for a positive active material; the binder solution was prepared by adding 5 parts by weight of polyvinylpyrrolidone and 1 part by weight polyethylene imine to acetonitrile; and the uniformly dispersed slurry was coated on a carbon-coated Al current collector by a doctor blade to provide a positive electrode.

The positive electrode, the vacuum dried polyethylene separator, and a lithium negative electrode were successively laminated and put into a pouch. An electrolyte of 1M $LiN(CF_3SO_2)$ in 1,3-dioxolane/dimethoxyethane/diglyme (2/4/4 volume ratio) was injected therein, and the pouch was sealed to provide a pouch-type test cell. The test cell had a theoretical capacity of 25 mAh.

EXAMPLE 3

A test cell was fabricated by the same procedure as described in Example 1, except that a mixture of the elemental sulfur powder and the ketjen black powder was subjected to a dry ball milling process without adding isopropyl alcohol to prepare a sulfur-ketjen black agglomerated complex.

EXAMPLE 4

A test cell was fabricated by the same procedure as described in Example 1, except that a sulfur powder having an average particle size of 5 μm was used.

Comparative Example 1

67.5 parts by weight of sulfur powder, 11.4 parts by weight of ketjen black, and 21.1 parts by weight of polyethylene oxide were mixed in an acetonitrile solvent to prepare a slurry of a positive active material of a lithium-sulfur battery. The uniformly dispersed slurry was coated on a carbon-coated Al current collector by a doctor blade to provide a positive electrode.

The positive electrode, the vacuum dried polyethylene separator, and a lithium negative electrode were successively laminated and put into a pouch. An electrolyte of 1M $LiN(CF_3SO_2)$ in 1,3-dioxolane/dimethoxyethane/diglyme (2/4/4 volume ratio) was injected therein, and the pouch was sealed to provide a pouch-type test cell.

Comparative Example 2

85 parts by weight of sulfur powder, 14 parts by weight of ketjen black, 5 parts by weight of polyvinyl pyrrolidone, and 1 part by weight of polyethylene imine were mixed in an acetonitrile solvent to prepare a slurry of a positive active material of a lithium-sulfur battery. The uniformly dispersed slurry was coated on a carbon-coated Al current collector by a doctor blade to provide a positive electrode.

The positive electrode, the vacuum dried polyethylene separator, and a lithium negative electrode were successively laminated and put into a pouch. An electrolyte of 1M $LiN(CF_3SO_2)$ in 1,3-dioxolane/dimethoxyethane/diglyme (2/4/4 volume ratio) was injected therein, and the pouch was sealed to provide a pouch-type test cell.

Figure 6A:
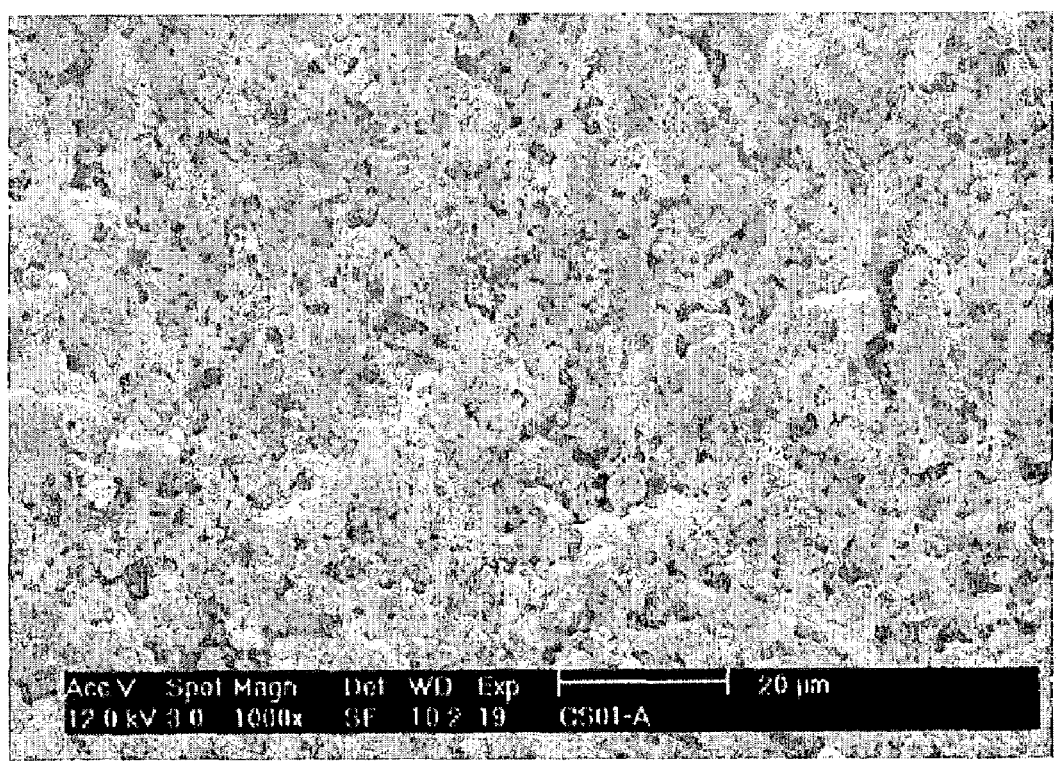
FIG. 6A shows a SEM photograph of an electrode plate using a positive active material according to Example 1 of the present invention.
Figure 6B:
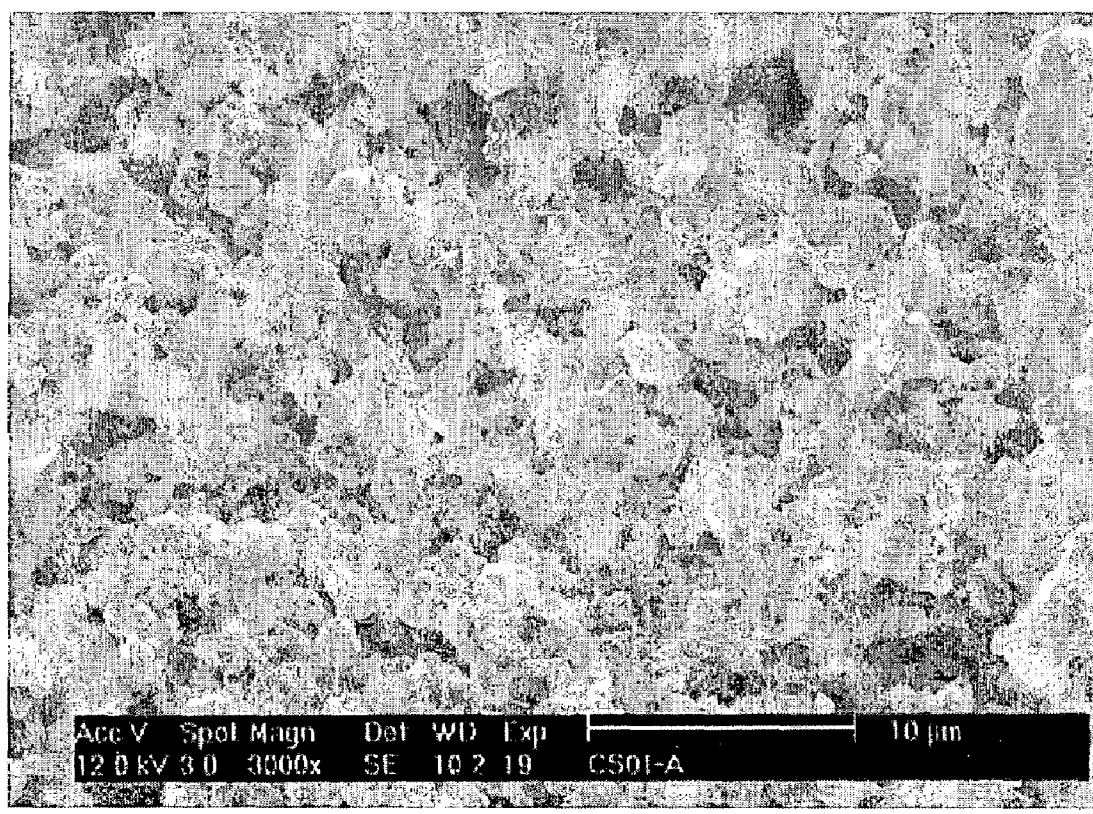
FIG. 6B shows an enlarged SEM photograph of FIG. 6A.
Figure 7A:
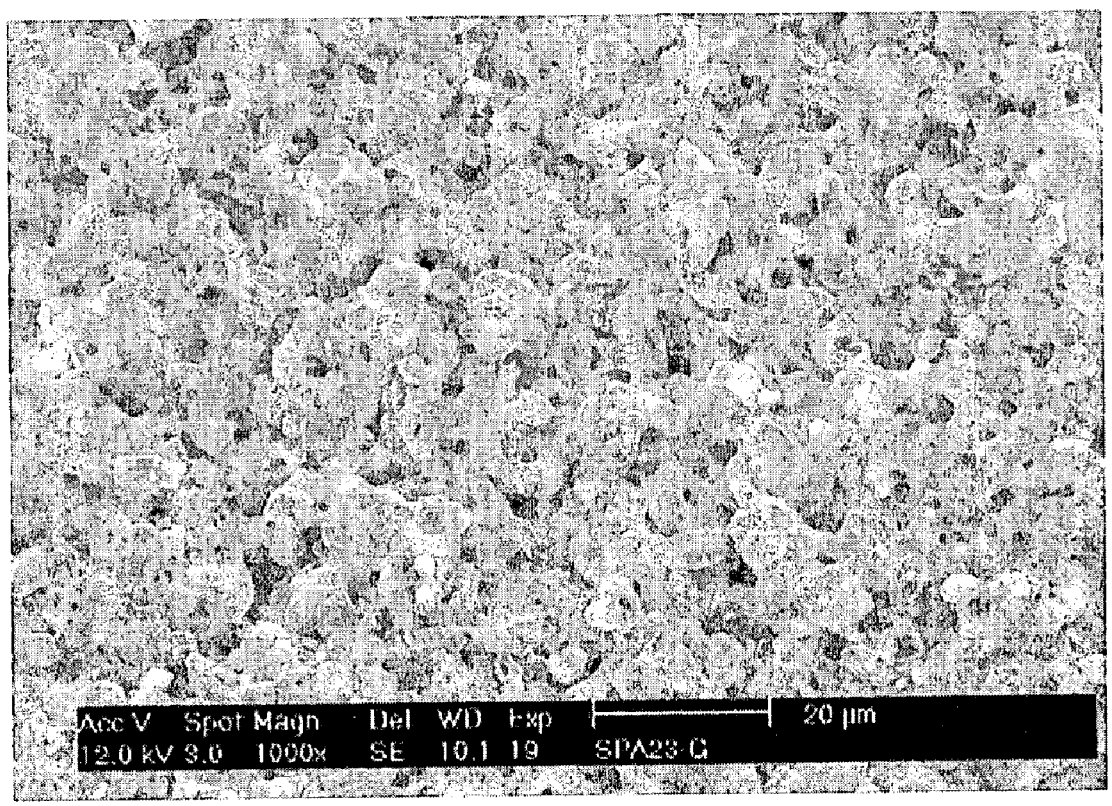
FIG. 7A shows a SEM photograph of an electrode plate using a positive active material according to Comparative Example 1.
Figure 7B:
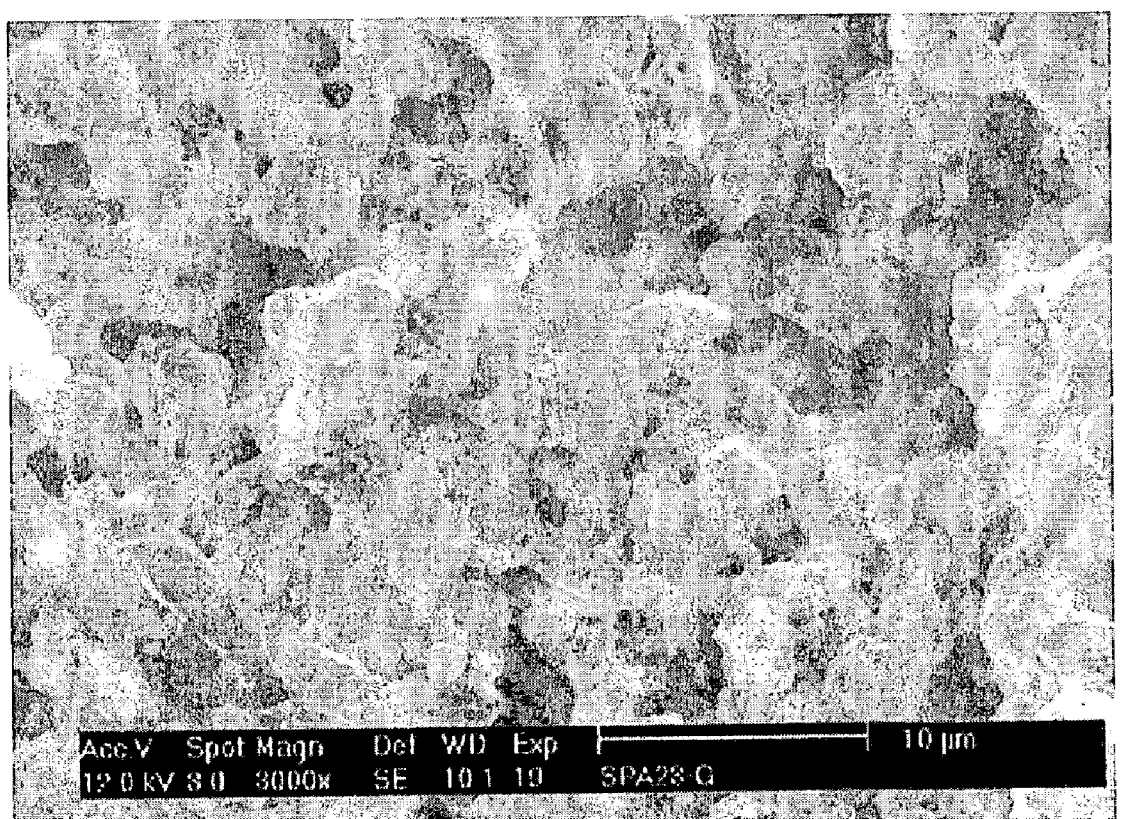
FIG. 7B shows an enlarged SEM photograph of FIG. 7A.

FIG. 6A shows a Scanning Electron Microscope photograph (SEM; ×1000) of an electrode plate using a sulfur-ketjen black agglomerated complex according to Example 1, and FIG. 6B shows an enlarged SEM photograph (×3000) thereof. For comparison, FIG. 7A shows a SEM photograph (×1000) of an electrode plate according to Comparative Example 1, and FIG. 7B shows an enlarged SEM photograph (×3000) thereof.

As shown in FIGS. 6A and 6B, in the electrode plate using the positive active material of sulfur-ketjen black agglomerated complex according to Example 1, the sulfur has a small average particle size since the sulfur particles are not aggregated. On the other hand, the electrode plate according to Comparative Example 1 has sulfur particles having average particle sizes that are significantly larger than those of Example 1, as shown in FIGS. 7A and 7B.

Figure 8A:
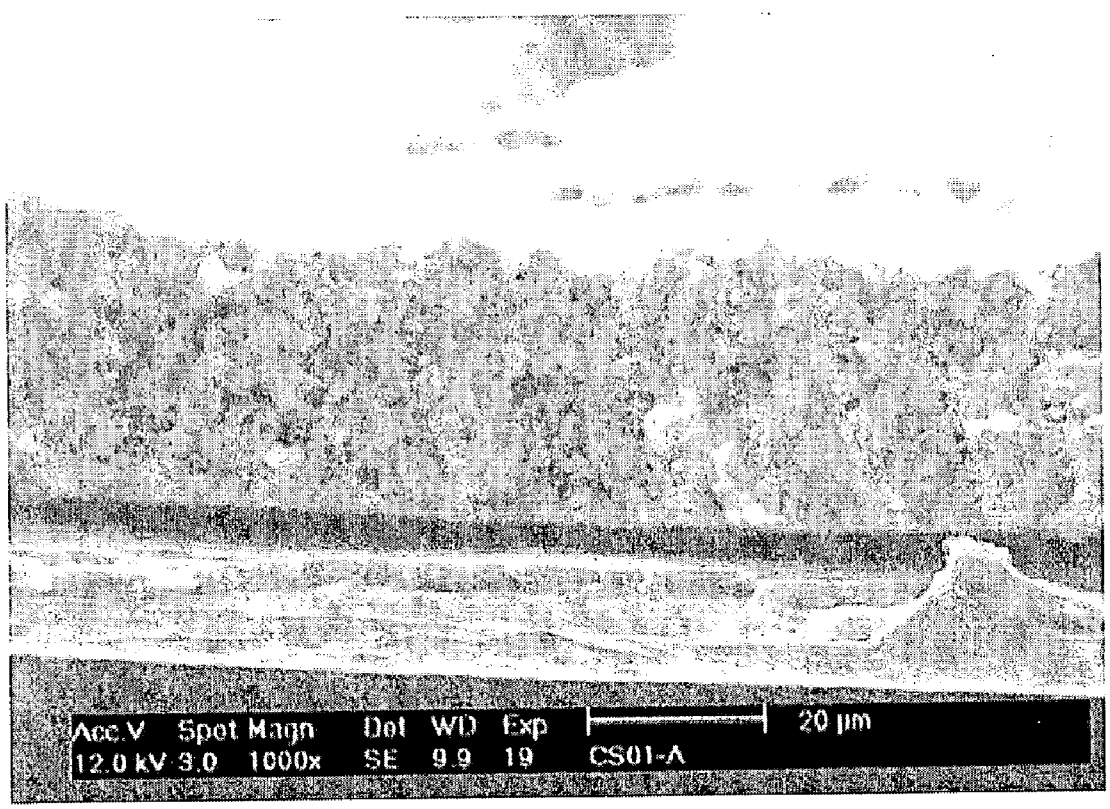
FIG. 8A shows a SEM photograph of a cross-section of an electrode plate according to Example 1 of the present invention.
Figure 8B:
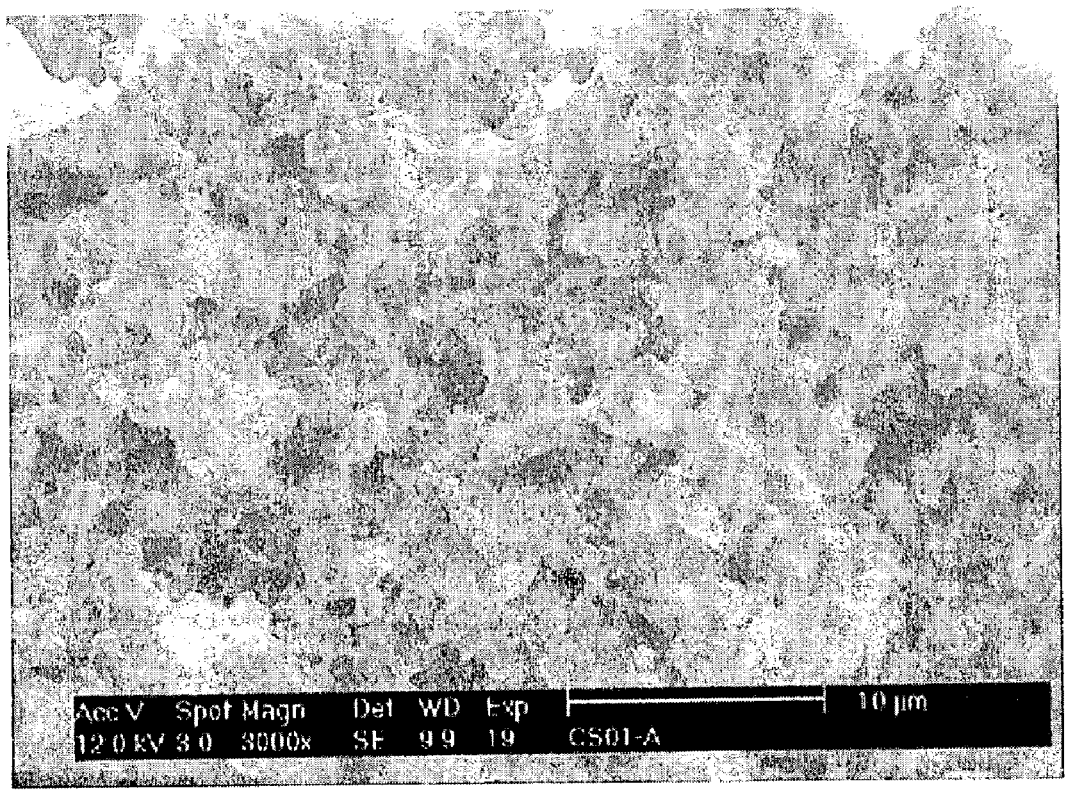
FIG. 8B shows an enlarged SEM photograph of FIG. 8A.
Figure 9A:
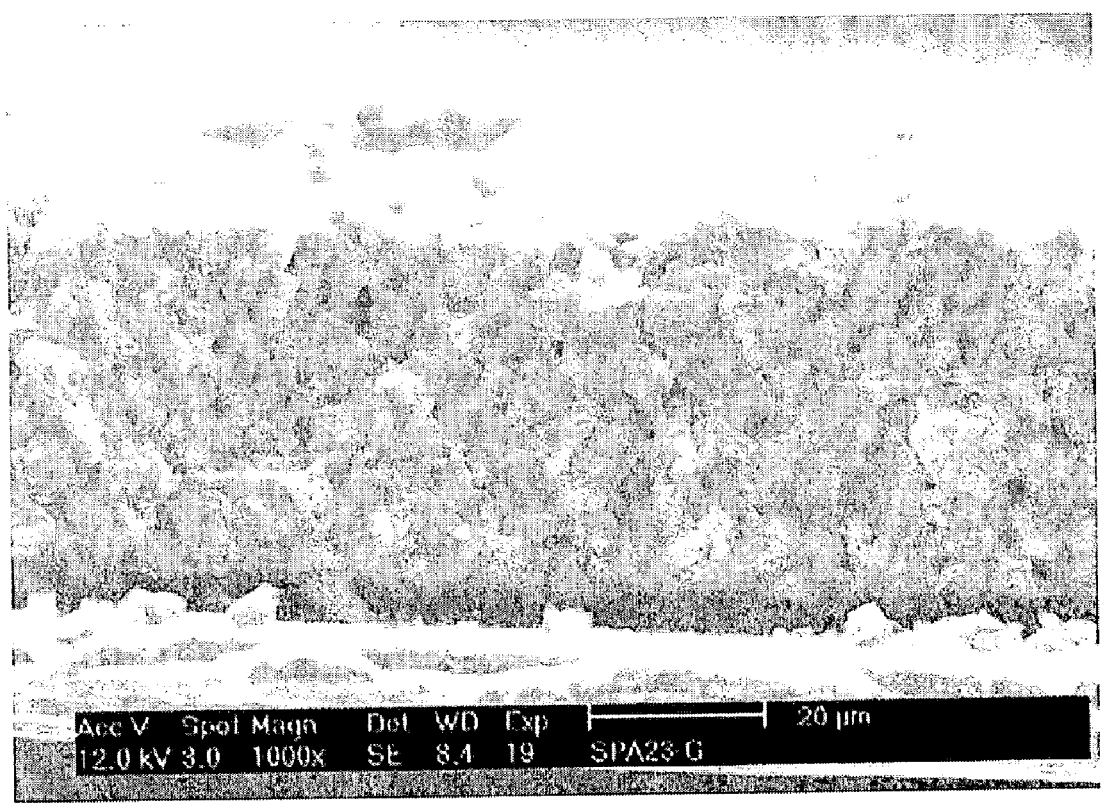
FIG. 9A shows a SEM photograph of a cross-section of an electrode plate according to Comparative Example 1.
Figure 9B:
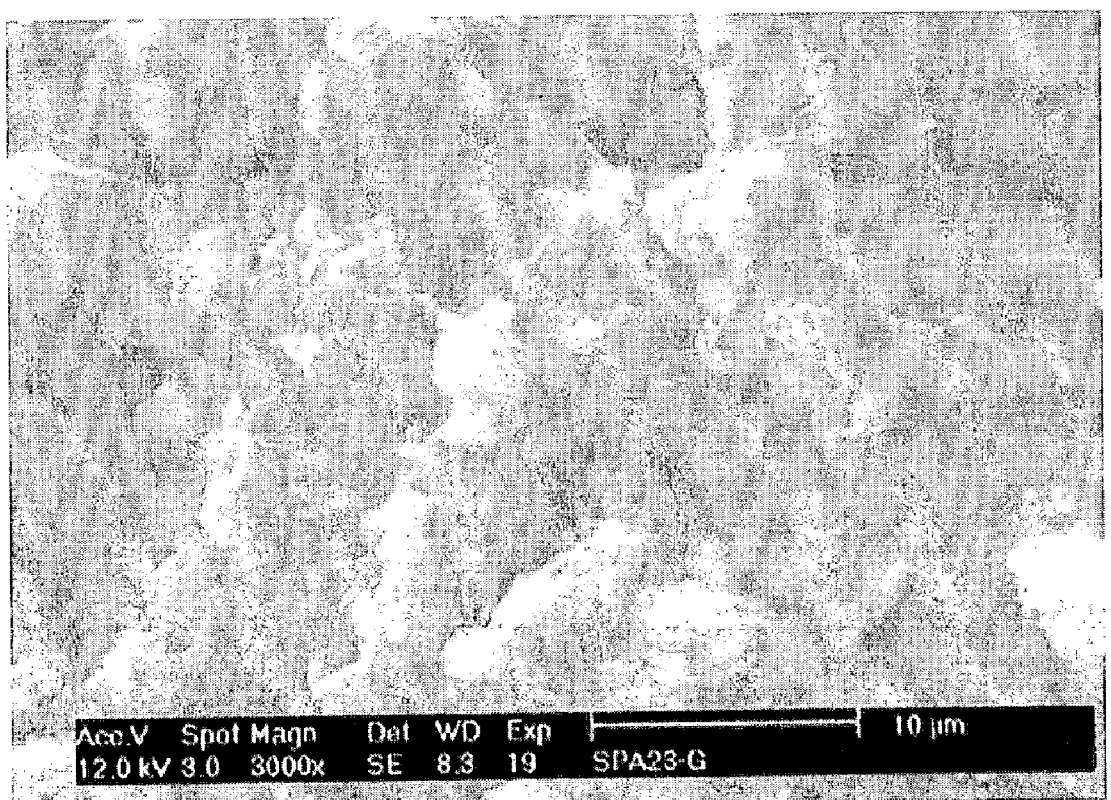
FIG. 9B shows an enlarged SEM photograph of FIG. 9A.

FIGS. 8A and 9A show SEM photographs (×1000) of cross-sections of electrodes according to Example 1 and Comparative Example 1, respectively. FIGS. 8B and 9B show enlarged SEM photographs (×3000) of FIGS. 8A and 9A, respectively. As shown in FIG. 8A, the electrode plate according to Example 1 has a thin thickness and excellent charge-density since the positive active material has a small average particle size. On the other hand, the electrode plate of Comparative Example 1 shown in FIG. 9A has a thickness that is significantly greater than that of Example 1 due to the large average particle size of the positive active material.

Cells fabricated according to Examples and Comparative Examples were subjected to the formation process. Then, the test cells were measured for cycle-life characteristics. The cut-off voltage on the charge and discharge was set at 1.5–2.8 V on the formation and cycle-life tests.

The formation process was carried out while charging and discharging test cells of Examples and Comparative Examples 5 times. For the first cycle, testing of cells was begun by discharging at a current density of 0.2 mA/cm$^2$ since the cells had already been charged. The charge current density was constantly maintained at 0.4 mA/cm$^2$ (0.2C) from the second to the fifth cycles, while the discharge current density was changed to 0.2, 0.4, 1.0, and 2.0 mA/μm (the respective C-rates were 0.1C, 0.2C, 0.5C, and 1C).

Figure 10:
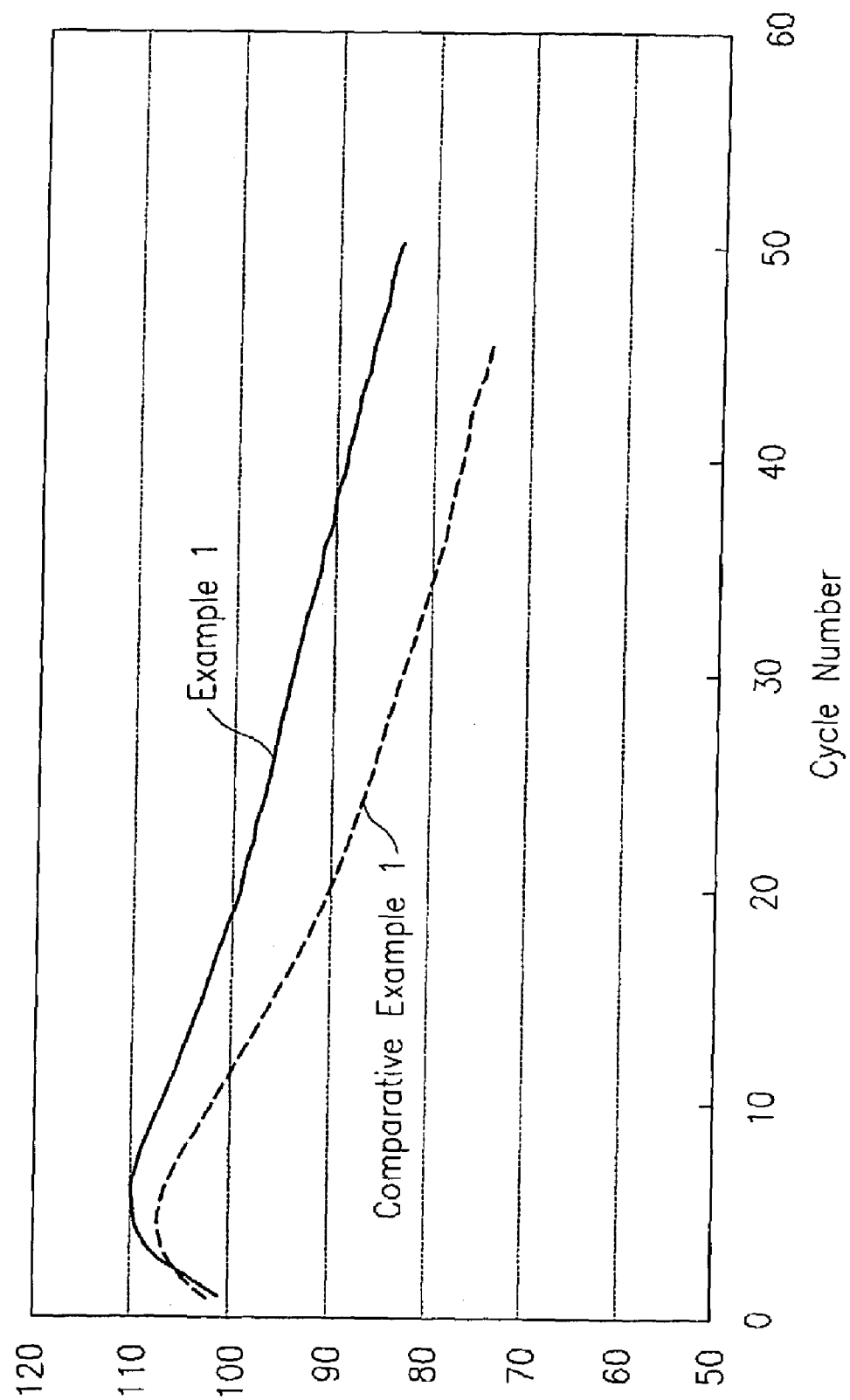
FIG. 10 shows a graph illustrating cycle-life characteristics of test cells according to Example 1 of the present invention and Comparative Example 1.

After subjecting test cells of Example 1 and Comparative Example 1 to the formation process, test cells were measured for cycle-life characteristics. The cells were charged and discharged at a charge current density of 0.4 mA/cm$^2$ (0.2C) and a discharge current density of 1.0 mA/cm$^2$ (0.5C). The sulfur utilization upon completion of each cycle was measured and the results are shown in FIG. 10. If all elemental sulfur in the positive electrode reacts completely (so that all sulfur resides in $Li_2S_2$), the sulfur in the electrode is 100% utilized so that a capacity of 837.5 mAh per sulfur 1 g is extracted during discharge. FIG. 10 shows that the test cell according to Example 1 has excellent cycle-life characteristics that are superior to those of Comparative Example 1.

Figure 11:
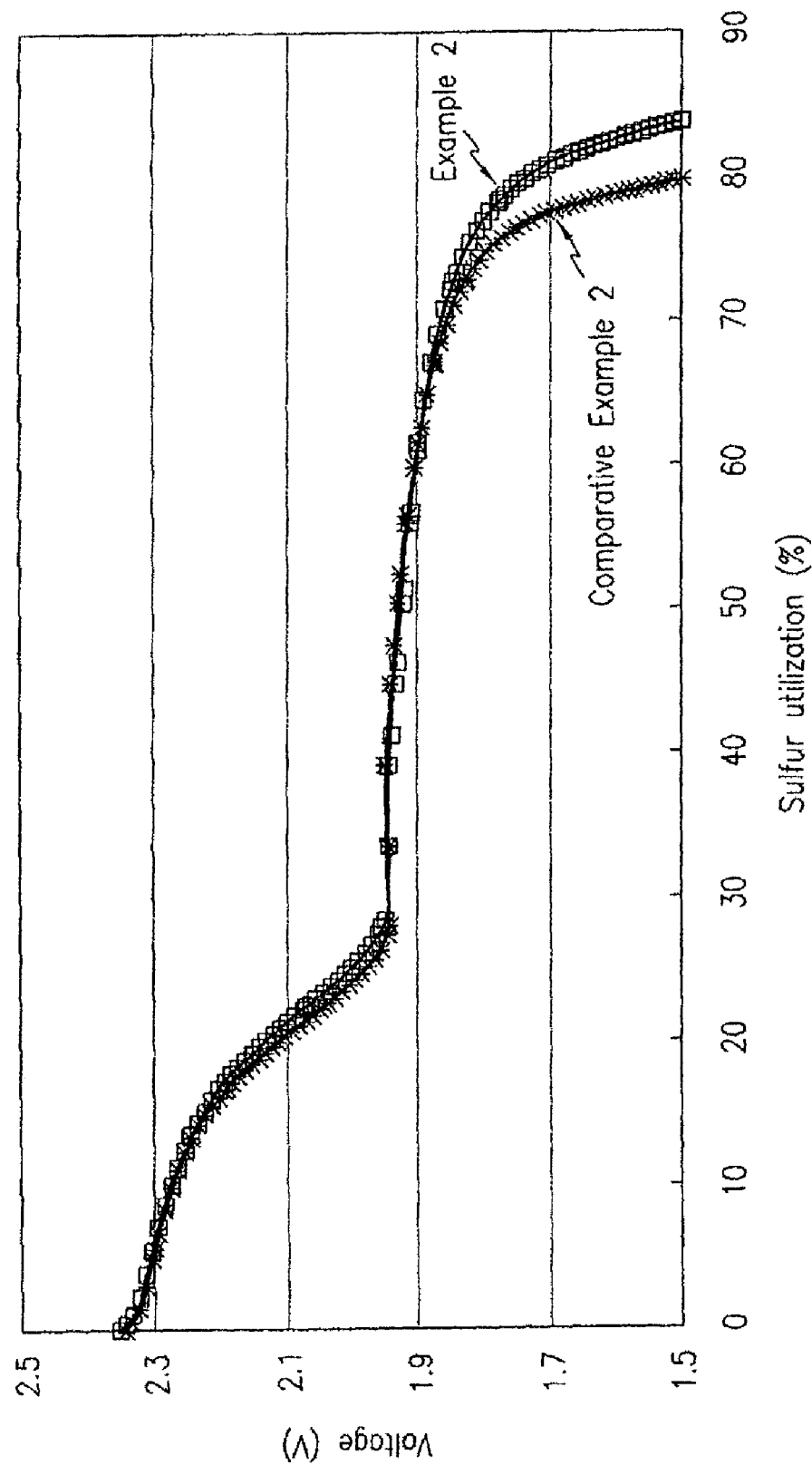
FIG. 11 shows a graph illustrating sulfur utilization of test cells according to Example 2 of the present invention and Comparative Example 2.

After subjecting test cells of Example 2 and Comparative Example 2 to the formation process, test cells were measured on cycle-life characteristics. The cells are charged and discharged at a charge current density of 1 mA/cm$^2$ (0.5C) and a discharge current density of 2.0 mA/cm$^2$(1C). FIG. 11 shows a discharge curve of test cells according to Example 2 and Comparative Example 2 at the first cycle. As shown in FIG. 11, the sulfur utilization of the cell according to Example 2 was 84% while that of Comparative Example 2 was 78%. The sulfur utilization of the $10^{th}$ cycle was 82% for Example 2 and 76% for Comparative Example 2, which shows that the cycle-life characteristics of Example 2 were superior to those of Comparative Example 2.

The sulfur-conductive agent-agglomerated complex according to the present invention has various advantages in that the positive active material is easily dispersed during the preparation of slurry, the size of sulfur particles is uniformly regulated by preventing the aggregation of sulfur particles, and the pores are uniformly distributed and the pore size generated on the positive electrode is decreased during charge and discharge. The conductive agent is present on the surface of sulfur particles only in the amount required to form a conductive network, resulting in the amount of conductive agent decreasing and the amount of sulfur particles increasing to provide a lithium-sulfur battery having a high capacity.

The lithium-sulfur battery of the present invention may be utilized to provide power in an electronic device. For example, the lithium-sulfur battery may be implemented in one of a pager, a cellular telephone, a portable telephone, a two-way radio, a video game, a portable digital assistant, a portable television, a portable computer, a notebook computer, a calculator, a computer, a telephone, a check-out device that registers purchases, a monitoring device, an electronic toy, a digital clock, and the like.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A positive active material of a lithium-sulfur battery comprising:
   a sulfur-conductive agent-agglomerated complex in which a conductive agent particle is attached onto a surface of a sulfur particle having an average particle size less than or equal to 7 μm,
   wherein the conductive agent has an average particle size between 10 nm and 20 μm.

2. The positive active material of a lithium-sulfur battery according to claim 1, wherein the sulfur particle has an average particle size less than or equal to 5 μm.

3. The positive active material of a lithium-sulfur battery according to claim 2, wherein the sulfur particle has an average particle size of no more than 3 μm.

4. The positive active material of a lithium-sulfur battery according to claim 1, wherein the conductive agent is selected from the group consisting of carbon black, graphite, carbon fiber, carbon nanotubes, activated carbon, carbon prepared by heat-treating cork or pitch, a metal powder, a metal compound, or a mixture thereof.

5. The positive active material of a lithium-sulfur battery according to claim 4, wherein the carbon black is selected from the group consisting of ketjen black, denka black, acetylene black, thermal black, and channel black.

6. The positive active material of a lithium-sulfur battery according to claim 4, wherein the graphite is a synthetic graphite or a natural graphite.

7. The positive active material of a lithium-sulfur battery according to claim 4, wherein the metal powder is selected from the group consisting of Sc, Ti, V, Cr, Mn, Fe, Co, Ni, Cu, Zn, and Al.

8. The positive active material of a lithium-sulfur battery according to claim 4, wherein the metal compound is selected from the group consisting of $SnPO_4$, titanium oxide, $LaSrCoO_3$, and $LaSrMnO_3$.

9. The positive active material of a lithium-sulfur battery according to claim 1, wherein the conductive agent is carbon black having an average particle size between 10 nm and 200 nm.

10. The positive active material of a lithium-sulfur battery according to claim 9, wherein the conductive agent is carbon black having an average particle size between 10 nm and 100 nm.

11. The positive active material of a lithium-sulfur battery according to claim 1, wherein the conductive agent is graphite having an average particle size between 100 nm and 5 µm.

12. The positive active material of a lithium-sulfur battery according to claim 11, wherein the conductive agent is graphite having an average particle size between 100 nm and 1 µm.

13. The positive active material of a lithium-sulfur battery according to claim 1, wherein the conductive agent is a mixture of carbon black and graphite having different average particle sizes.

14. The positive active material of a lithium-sulfur battery according to claim 1, wherein the sulfur-conductive agent-agglomerated complex is manufactured by mixing a sulfur powder and a conductive agent powder to form a mixture and milling the mixture.

15. The positive active material of a lithium-sulfur battery according to claim 14, wherein the milling is performed by either dry milling or wet milling, wherein the dry milling is carried out without adding a solvent and the wet milling is carried out adding a solvent.

16. The positive active material of a lithium-sulfur battery according to claim 14, wherein the milling is performed for a period comprising between 6 hours and 5 days.

17. The positive active material of a lithium-sulfur battery according to claim 1, wherein the sulfur-conductive agent-agglomerated complex is manufactured by mixing a sulfur powder and a conductive agent powder to form a mixture and milling the mixture, followed by drying at a temperature of between 30° C. and 100° C.

18. The positive active material of a lithium-sulfur battery according to claim 1, wherein the sulfur-conductive agent-agglomerated complex has a sulfur to conductive agent weight ratio of 5:1 to 10:1.

19. The positive active material of a lithium-sulfur battery according to claim 18, wherein the sulfur-conductive agent-agglomerated complex has a sulfur to conductive agent weight ratio of 6:1 to 8:1.

20. A lithium-sulfur battery comprising:
a positive electrode comprising a sulfur-conductive agent-agglomerated complex, in which a conductive agent particle is attached onto a surface of a sulfur particle having an average particle size less than or equal to 7 µm;
a negative electrode including a negative active material selected from the group consisting of a material capable of reversibly intercalating lithium ions, a material capable of reversibly reacting with lithium ions to form a lithium-included compound, a lithium metal, and a lithium alloy; and
an electrolyte impregnated in the positive electrode and the negative electrode,
wherein the conductive agent has an average particle size between 10 nm and 20 µm.

21. The lithium-sulfur battery according to claim 20, wherein the positive electrode further comprises at least one additive selected from the group consisting of transition metals, Group IIIA elements, Group IVA elements, sulfur compounds thereof, and alloys thereof.

22. The lithium-sulfur battery according to claim 21, wherein the transition metals are selected from the group consisting of Sc, Ti, V, Cr, Mn, Fe, Co, Ni, Cu, Zn, Y, Zr, Nb, Mo, Tc, Ru, Rh, Pd, Ag, Cd, Ta, W, Re, Os, Ir, Pt, Au, and Hg; wherein the Group IIIA elements are selected from the group consisting of Al, Ga, In, and Tl; and wherein the Group IVA elements are selected from the group consisting of Si, Ge, Sn, and Pb.

23. The lithium-sulfur battery according to claim 20, wherein the positive electrode further comprises an electrically conductive agent facilitating movement of electrons.

24. The lithium-sulfur battery according to claim 20, wherein the positive electrode further comprises a current collector and a binder binding the sulfur-conductive agent-agglomerated complex to the current collector, the binder being selected from the group consisting of poly(vinyl acetate), polyvinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride, a copolymer of polyhexafluoropropylene and polyvinylidene fluoride (KYNAR), poly (ethyl acrylate), polytetrafluoro ethylene, polyvinyl chloride, polyacrylonitrile, polyvinylpyridine, polystyrene, derivatives thereof, blends thereof, and copolymers thereof.

25. The lithium-sulfur battery according to claim 20, wherein the material capable of reversibly intercalating lithium ions is crystalline carbon, amorphous carbon, or a mixture thereof; wherein the material capable of reversibly reacting with lithium ions to form a lithium-included compound is $SnO_2$, titanium nitrate, or Si; and wherein the lithium alloy is an alloy of lithium with a metal selected from the group consisting of Na, K, Rb, Cs, Fr, Be, Mg, Ca, Sr, Ba, Ra, Al, and Sn.

26. The lithium-sulfur battery according to claim 20, wherein the negative electrode is one of an inorganic protective layer, an organic protective layer, or both an inorganic protective layer and an organic protective layer, and the negative electrode is laminated on the surface of lithium metal.

27. The lithium-sulfur battery according to claim 26, wherein the inorganic protective layer is a material selected from the group consisting of Mg, Al, B, Ca, Sn, Pb, Cd, Si, In, Ga, lithium silicate, lithium borate, lithium phosphate, lithium phosphor nitride, lithium silicosulfide, lithium borosulfide, lithium aluminosulfide, and lithium phosphosulfide; and wherein the organic protective layer is a conductive monomer, oligomer, or polymer selected from the group consisting of poly(p-phenylene), polyacetylene, poly(p-phenylene vinylene), polyanyline, polypyrrol, polythiophen, poly(2,5-ethylene vinylene), acetylene, poly(peri-naphthalene), polyacene, and poly(naphthalene-2,6-diyl).

28. The lithium-sulfur battery according to claim 20, wherein the electrolyte is one of a solid electrolyte or a liquid electrolyte.

29. The lithium-sulfur battery according to claim 20, wherein the electrolyte comprises a salt having an organic cation having a van der Waals volume at least equal to 100 $Å^3$.

30. An electronic device having a lithium-sulfur battery in accordance with claim 20.

31. The electronic device of claim 30 wherein the electronic device is one of a pager, a cellular telephone, a portable telephone, a two-way radio, a video game, a portable digital assistant, a portable television, a portable computer, a notebook computer, a calculator, a computer, a telephone, a check-out device that registers purchases, a monitoring device, an electronic toy, and a digital clock.

* * * * *